United States Patent
Fukatani et al.

(10) Patent No.: US 9,181,479 B2
(45) Date of Patent: *Nov. 10, 2015

(12)
(54) RETARDATION ELEMENT

(75) Inventors: Juichi Fukatani, Shiga (JP); Izumi Omoto, Shiga (JP); Seiko Ichikawa, Shiga (JP); Kouichi Tanaka, Tokyo (JP); Mayu Kameda, Tokyo (JP)

(73) Assignees: SEKISUI CHEMICAL CO., LTD., Osaka (JP); NIPPON KAYAKU KABUSHIKI KAISHA, Tokyo (JP); POLATECHNO CO., LTD, Niigata (JP)

( * ) Notice: Subject to any disclaimer, the term of this patent is extended or adjusted under 35 U.S.C. 154(b) by 207 days.

This patent is subject to a terminal disclaimer.

(21) Appl. No.: 13/133,489

(22) PCT Filed: Dec. 8, 2009

(86) PCT No.: PCT/JP2009/070571
§ 371 (c)(1),
(2), (4) Date: Aug. 3, 2011

(87) PCT Pub. No.: WO2010/067809
PCT Pub. Date: Jun. 17, 2010

(65) Prior Publication Data
US 2011/0293856 A1  Dec. 1, 2011

(30) Foreign Application Priority Data
Dec. 9, 2008 (JP) ................. 2008-313473

(51) Int. Cl.
*G02F 1/13363* (2006.01)
*C09K 19/20* (2006.01)
*C09K 19/30* (2006.01)
*C09K 19/54* (2006.01)
(Continued)

(52) U.S. Cl.
CPC ......... *C09K 19/2007* (2013.01); *C09K 19/3068* (2013.01); *C09K 19/54* (2013.01); *G02F 1/13363* (2013.01); *B32B 2457/202* (2013.01); *C08F 222/1006* (2013.01); *C09K 2019/0448* (2013.01); *Y10T 428/105* (2015.01); *Y10T 428/1036* (2015.01); *Y10T 428/2891* (2015.01); *Y10T 428/31504* (2015.04)

(58) Field of Classification Search
CPC ..................... C08F 222/1006; C09K 19/2007; C09K 19/3068; C09K 19/54; C09K 2019/0448; G02F 1/13363; Y10T 428/105; B32B 2457/202
USPC .......................... 428/1.33, 1.5; 349/117–118; 106/169.39
See application file for complete search history.

(56) References Cited

U.S. PATENT DOCUMENTS

| 3,867,016 A | 2/1975 | Sagane |
| 5,235,443 A | 8/1993 | Barnik et al. |
| 5,409,979 A * | 4/1995 | Nakai ............ 524/306 |

(Continued)

FOREIGN PATENT DOCUMENTS

| CN | 1516816 A | 7/2004 |
| CN | 101218523 | 7/2008 |

(Continued)

OTHER PUBLICATIONS

JPO Website Machine English Translation of JP 2009-098618, Nakayama et al., May 7, 2009.*

(Continued)

*Primary Examiner* — Sophie Hon
(74) *Attorney, Agent, or Firm* — Wenderoth, Lind & Ponack, L.L.P.

(57) ABSTRACT

A retardation element containing a liquid crystalline compound, and at least one compound selected from the group consisting of a compound represented by the following formula (1), a compound represented by the following formula (2) and a compound represented by the following formula (3). In the formula (1), n represents an integer of 3 to 10 and $R^2$ represents a $-CH_2-CH_2-$ group, a $-CH_2-CH(CH_3)-$ group or a $-CH_2-CH_2-CH_2-$ group. In the formula (2), $R^3$ represents a $-(CH_2)_p-$ group or a phenylene group and p represents an integer of 4 to 8. In the formula (3), $R^4$ represents a substituted phenylene group. In the formulas (1) to (3), $R^{1-1}$, $R^{1-2}$ and $R^{1-3}$ each represent an alkyl group having a branched structure having 5 or more carbon atoms and $R^{1-1}$, $R^{1-2}$ and $R^{1-3}$ may be the same or different.

$$R^{1-1}-\overset{O}{\underset{\|}{C}}-O\overset{}{(}R^2-O\overset{}{)}_n\overset{O}{\underset{\|}{C}}-R^{1-2} \quad (1)$$

$$R^{1-1}-O-\overset{O}{\underset{\|}{C}}-R^3-\overset{O}{\underset{\|}{C}}-O-R^{1-2} \quad (2)$$

$$R^{1-1}-O-\overset{O}{\underset{\|}{C}}-R^4\overset{\overset{O}{\underset{\|}{C}}-O-R^{1-2}}{\underset{\overset{\|}{\underset{O}{C}}-O-R^{1-3}}{}} \quad (3)$$

19 Claims, No Drawings

(51) Int. Cl.
*C08F 222/10* (2006.01)
*C09K 19/04* (2006.01)

(56) References Cited

U.S. PATENT DOCUMENTS

| | | | |
|---|---|---|---|
| 6,259,559 | B1 | 7/2001 | Kobayashi et al. |
| 6,630,973 | B1* | 10/2003 | Matsuoka et al. ............ 349/117 |
| 2003/0139520 | A1 | 7/2003 | Toyama et al. |
| 2003/0192638 | A1* | 10/2003 | Yang et al. .................... 156/230 |
| 2004/0096594 | A1 | 5/2004 | Takeuchi et al. |
| 2004/0100600 | A1* | 5/2004 | Takeuchi et al. ............. 349/117 |
| 2005/0243252 | A1* | 11/2005 | Matsuoka .................... 349/117 |
| 2005/0266175 | A1 | 12/2005 | Hsu et al. |
| 2006/0008658 | A1* | 1/2006 | Fukatani et al. ............. 428/437 |
| 2006/0062938 | A1* | 3/2006 | Takeko et al. ................ 428/1.55 |
| 2006/0141171 | A1* | 6/2006 | Tazaki et al. ................. 428/1.21 |
| 2006/0246296 | A1* | 11/2006 | Xia et al. ...................... 428/412 |
| 2007/0009676 | A1 | 1/2007 | Tamagawa et al. |
| 2007/0154718 | A1* | 7/2007 | Silverman et al. ......... 428/411.1 |
| 2007/0252293 | A1* | 11/2007 | Sato et al. .................... 264/1.31 |
| 2008/0129073 | A1 | 6/2008 | Nishikawa |
| 2009/0027599 | A1* | 1/2009 | Ohgaru et al. ................. 349/96 |
| 2009/0108234 | A1* | 4/2009 | Tano et al. ............... 252/299.66 |

FOREIGN PATENT DOCUMENTS

| | | |
|---|---|---|
| EP | 1 281 690 | 2/2003 |
| JP | 3-45906 | 2/1991 |
| JP | 3-291622 | 12/1991 |
| JP | 5-85784 | 4/1993 |
| JP | 6-43453 | 2/1994 |
| JP | 8-50206 | 2/1996 |
| JP | 8-259280 | 10/1996 |
| JP | 10-96874 | 4/1998 |
| JP | 2003-96207 | 4/2003 |
| JP | 2003-121853 | 4/2003 |
| JP | 2003-315556 | 11/2003 |
| JP | 2004-29824 | 1/2004 |
| JP | 2004-125830 | 4/2004 |
| JP | 2005-187271 | 7/2005 |
| JP | 2006-98466 | 4/2006 |
| JP | 2008-9346 | 1/2008 |
| JP | 2008-105942 | 5/2008 |
| JP | 2008-107659 | 5/2008 |
| JP | 2009-98618 | 5/2009 |
| WO | WO 2005081642 A2 * | 9/2005 |

OTHER PUBLICATIONS

International Search Report issued Jan. 19, 2010 in International (PCT) Application No. PCT/JP2009/070571.

International Search Report issued Feb. 2, 2010 in International (PCT) Application No. PCT/JP2009/071270.

Search Report issued May 15, 2014, in corresponding European Application No. 09831913.0.

Extended European Search Report issued Jun. 17, 2014 in European Application No. 09834849.3.

* cited by examiner

RETARDATION ELEMENT

This application is a U.S. national stage of International Application No. PCT/W2009/070571 filed Dec. 8, 2009.

TECHNICAL FIELD

The present invention relates to a retardation element which has excellent heat resistance, is small in the changes in the retardation value in an atmosphere of high temperatures, and is capable of maintaining stable optical performance.

BACKGROUND ART

A retardation element has a function of converting the direction of linearly polarized light vibrating in a certain direction to another direction, or a function of converting circularly polarized light or elliptically polarized light to linearly polarized light, and by utilizing these functions, for example, viewing angles, a contrast, and the like of liquid crystal displays (LCD) can be improved. As specific examples of utilizing this function of converting polarized light of the retardation element, there are known an example in which a retardation element referred to as a half-wave plate is employed as a polarization rotator of a polarizing beam splitter of a liquid crystal projector, as disclosed in Patent Document 1, and an example in which a retardation element referred to as a quarter-wave plate is employed in order to convert circularly polarized light obtained from a cholesteric liquid crystal to linearly polarized light, as disclosed in Patent Document 2. This quarter-wave plate is known to be used for an anti-reflection filter or the like as a circularly polarizing plate formed by being combined with a polarizing plate.

Examples of the retardation element include retardation elements formed by uniaxially stretching or biaxially stretching conventionally known plastic films such as polycarbonate films, polyarylate films, polyethersulfone films, cycloolefin polymer films, and the like. Generally, these retardation elements are referred to as a retardation plate or a retardation film.

Performance of the retardation element can be determined, for example, by a retardation value derived from the product of the birefringence which represents the difference between the refractive index in a direction of a slow axis (a direction in which the refractive index is maximized in one plane) and the refractive index in a direction of a fast axis (a direction perpendicular in one plane to the slow axis direction) and the thickness of the element. Further, in recent years, as disclosed in Patent Documents 3 to 7, the retardation element has been prepared by aligning a liquid crystalline compound in a specific direction and fixing the alignment state.

The retardation element using the liquid crystalline compound has been attracting attention since the element is characterized in that it can be a thin film which cannot be realized in a plastic film and can realize a complicated alignment state which cannot be realized by stretching a plastic film.

It is known that viewing angle properties, colors and a contrast of various liquid crystal displays can be improved by using the retardation element employing such a liquid crystalline compound. For example, Patent Document 3 discloses an improvement in viewing angle properties of a TN (twisted nematic) type liquid crystal display which uses a retardation element having a discotic liquid crystal layer in which a hybrid alignment is employed. Further, in Patent Document 4, color compensation of a STN (super twisted nematic) type liquid crystal display is disclosed. Patent Document 5 discloses an improvement in viewing angle of an ECB (electrically controlled birefringence) type liquid crystal display which uses a retardation element having a liquid crystalline polyester in which a hybrid alignment is employed. Furthermore, Patent Document 6 discloses an improvement in viewing angle properties of a VA (vertically alignment) type liquid crystal display which uses a twisted aligned liquid crystal layer having a wavelength region of selective reflection in an ultraviolet region and an OCB (optically compensated bond) type liquid crystal display. In Patent Document 7, compounds to be used for the retardation element, in which liquid crystalline compounds for compensating the above-mentioned liquid crystal displays are used, and a production method are disclosed.

The above-mentioned retardation value is important in order that the retardation element properly convert the polarized light at a desired wavelength.

However, the retardation value can vary under various environmental conditions, for example, in an atmosphere of high temperature or in an atmosphere of high temperature and high humidity, and the solution of the problem is desired. For example, in the case of liquid crystal displays used in an automobile instrument panel section or a liquid crystal projector, the viewing angle properties or the contrast of the liquid crystal display may be deteriorated when the retardation value varies due to exposure of the display to a high temperature atmosphere.

PRIOR ART DOCUMENTS

Patent Documents

Patent Document 1: Japanese Kokai Publication Hei-6-43453 (JP-A H06-43453)
Patent Document 2: Japanese Kokai Publication Hei-3-45906 (JP-A H03-45906)
Patent Document 3: Japanese Kokai Publication Hei-8-50206 (JP-A H08-50206)
Patent Document 4: Japanese Kokai Publication Hei-3-291622 (JP-A H03-291622)
Patent Document 5: Japanese Kokai Publication 2004-125830 (JP-A 2004-125830)
Patent Document 6: Japanese Kokai Publication 2003-315556 (JP-A 2003-315556)
Patent Document 7: Japanese Kokai Publication 2004-29824 (JP-A 2004-29824)

SUMMARY OF THE INVENTION

Problems to be Solved by the Invention

It is an object of the present invention to provide a retardation element which has excellent heat resistance, is small in the changes in the retardation value in an atmosphere of high temperatures, and is capable of maintaining stable optical performance.

Means for Solving the Problems

The present invention pertains to a retardation element containing a liquid crystalline compound, and at least one compound selected from the group consisting of a compound represented by the following formula (1), a compound represented by the following formula (2) and a compound represented by the following formula (3).

[Formula 1]

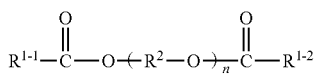
(1)

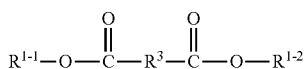
(2)

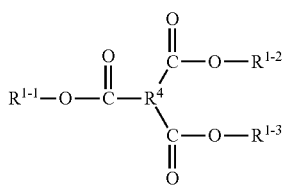
(3)

In the formula (1), n represents an integer of 3 to 10 and $R^2$ represents a —$CH_2$—$CH_2$— group, a —$CH_2$—$CH(CH_3)$— group or a —$CH_2$—$CH_2$—$CH_2$— group.

In the formula (2), $R^3$ represents a —$(CH_2)_p$— group or a phenylene group and p represents an integer of 4 to 8.

In the formula (3), $R^4$ represents a substituted phenylene group.

In the formulas (1) to (3), $R^{1-1}$, $R^{1-2}$ and $R^{1-3}$ each represent an alkyl group having a branched structure having 5 or more carbon atoms and $R^{1-1}$, $R^{1-2}$ and $R^{1-3}$ may be the same or different.

Hereinafter, the present invention will be described in detail.

The present inventors found that a retardation element containing at least a liquid crystalline compound and a specific compound has excellent heat resistance, is small in the changes in the retardation value in an atmosphere of high temperatures, and is capable of maintaining stable optical performance. These findings have now led to completion of the present invention.

The retardation element of the present invention contains a liquid crystalline compound, and at least one compound (hereinafter, also simply referred to as a "compound") selected from the group consisting of a compound represented by the formula (1), a compound represented by the formula (2) and a compound represented by the formula (3). The retardation element of the present invention has excellent heat resistance, is small in the changes in the retardation value in an atmosphere of high temperatures, and is capable of maintaining stable optical performance.

In the formulas (1) to (3), $R^{1-1}$, $R^{1-2}$ and $R^{1-3}$ each represent an alkyl group having a branched structure having 5 or more carbon atoms. When $R^{1-1}$, $R^{1-2}$ and $R^{1-3}$ are each an alkyl group having a branched structure, changes in the retardation value in an atmosphere of high temperatures are particularly small. Preferably, the lower limit of the number of the carbon atoms is 6 and the upper limit thereof is 18. Particularly, $R^{1-1}$, $R^{1-2}$ and $R^{1-3}$ are preferably each a $CH_3$—$(CH_2)_m$—$CH(C_2H_5)$— group, and more preferably each a 2-ethylhexyl group or a 2-ethylbutyl group. Here, m represents an integer of 1 to 3.

When $R^3$ is a phenylene group in the formula (2), $R^3$ may have a substituent at any of an ortho position, a meta position and a para position, but it preferably has a substituent at an ortho position.

When $R^4$ is a substituted phenylene group in the formula (3), $R^4$ may have a substituent at any of an ortho position, a meta position and a para position, but it preferably has a substituent at an ortho position and a para position.

In the formula (1), $R^2$ represents a —$CH_2$—$CH_2$— group, a —$CH_2$—$CH(CH_3)$— group or a —$CH_2$—$CH_2$—$CH_2$— group. Among these groups, the —$CH_2$—$CH_2$— group is suitable.

Examples of the compound represented by the formula (1) include triethylene glycol di-2-ethylhexanoate (3GO), tetraethylene glycol di-2-ethylhexanoate (4GO), triethylene glycol di-2-ethylbutyrate (3 GH), tetraethylene glycol di-2-ethylbutyrate, pentaethylene glycol di-2-ethylhexanoate, octaethylene glycol di-2-ethylhexanoate, nonaethylene glycol di-2-ethylhexanoate, decaethylene glycol di-2-ethylhexanoate, and the like.

Examples of the compound represented by the formula (2) include bis(2-ethylhexyl)adipate, bis(2-ethylbutyl)adipate, bis(2-ethylhexyl)azelate, bis(2-ethylbutyl)azelate, di-2-ethylhexyl sebacate, di-2-ethylbutyl sebacate, di-2-ethylhexyl phthalate, di-2-ethylbutyl phthalate, and the like.

Examples of the compound represented by the formula (3) include tri-2-ethylhexyl trimellitate, tri-2-ethylbutyl trimellitate, and the like.

The compound represented by the formula (1), the compound represented by the formula (2) and the compound represented by the formula (3) may be used alone or may be used in combination of two or more species of them. Particularly, the compound represented by the formula (1) is preferred since it is excellent in compatibility with the liquid crystalline compound used in the present invention and is capable of giving a stable retardation element. Among the compounds represented by the formula (1), triethylene glycol di-2-ethylhexanoate (3GO), tetraethylene glycol di-2-ethylhexanoate (4GO), and triethylene glycol di-2-ethylbutyrate (3 GH) are more preferred, and triethylene glycol di-2-ethylhexanoate (3GO) is furthermore preferred since they are excellent in the compatibility with the liquid crystalline compound used in the present invention and have a particularly excellent effect of suppressing the changes in the retardation value in an atmosphere of high temperatures.

The content of at least one compound selected from the group consisting of the compound represented by the formula (1), the compound represented by the formula (2) and the compound represented by the formula (3) is not particularly limited, but a preferred lower limit of the content is 0.1 parts by weight and a preferred upper limit is 300 parts by weight with respect to 100 parts by weight of the liquid crystalline compound. When the content of the compound is less than 0.1 parts by weight, the effect of suppressing the changes in the retardation value in an atmosphere of high temperatures may not be achieved. Even when the content of the compound is more than 300 parts by weight, the effect of the present invention of suppressing the changes in the retardation value in an atmosphere of high temperatures does not change. More preferably, the lower limit of the content of the compound is 0.5 parts by weight and the upper limit is 50 parts by weight, and furthermore preferably, the lower limit is 0.8 parts by weight and the upper limit is 30 parts by weight, and particularly preferably, the lower limit is 1 part by weight and the upper limit is 15 parts by weight.

The liquid crystalline compound is not particularly limited as long as it is a compound which exhibits liquid crystallinity in aligning in a specific direction (for example, horizontal alignment, vertical alignment, splay alignment, twisted alignment, tilted alignment, or the like). Examples of the liquid crystalline compound include main chain type liquid crystal polymers such as polyester, polyamide and polyesterimide; side chain type liquid crystal polymers such as polyacrylate, polymethacrylate, polymalonate and polyether; a polymerizable liquid crystal; and the like. The polymerizable liquid crystal refers to a liquid crystalline compound having a polymerizable group in its molecule. Particularly, the liquid crystalline compound is preferably a polymerizable liquid crystal because the state of alignment can be fixed by polymerization.

The polymerizable group is not particularly limited, and examples thereof include reactive groups such as a (meth) acryloyl group, a vinyl group, a chalconyl group, a cinnamoyl group, an epoxy group, and the like. The polymerizable liquid crystal commonly exhibits liquid crystallinity in a pre-polymerized state and is aligned in a specific direction and then polymerized to fix the alignment state. After the fixation of the alignment state, the polymerizable liquid crystal does not necessarily have to exhibit liquid crystallinity. Such a compound in which the alignment state is fixed by the polymerization is also included in the liquid crystalline compound in the present invention. If a compound obtained by polymerizing the polymerizable liquid crystal singly or by polymerizing a plurality of the polymerizable liquid crystals, or a compound obtained by copolymerizing the polymerizable liquid crystal with another polymerizable compound exhibits liquid crystallinity in aligning, this compound is included in the liquid crystalline compound of the present invention even if the polymerizable liquid crystal before polymerization or the compound after polymerization does not exhibit liquid crystallinity.

The polymerizable liquid crystal preferably has a mesogenic group in its molecule in order to exhibit liquid crystallinity.

Here, examples of the mesogenic group include rod-like substituents such as a biphenyl group, a terphenyl group, a group of phenyl ester of (poly)benzoic acid, a (poly)ether group, a benzylideneaniline group, an acenaphthoquinoxaline group and the like; plate-like substituents; disc-like substituents such as a triphenylene group, a phthalocyanine group, an aza-crown group and the like; and the like. That is, the mesogenic group has a capability of deriving a behavior of a liquid crystal phase. In addition, a liquid crystalline compound having a rod-like or plate-like substituent is known as a calamitic liquid crystal. Further, a liquid crystalline compound having a disk-like substituent is known as a discotic liquid crystal.

The polymerizable liquid crystal having a mesogenic group does not necessarily have to exhibit a liquid crystal phase and may be a polymerizable liquid crystal which exhibits a liquid crystal phase by mixing with another compound, or by mixing with another compound having a mesogenic group, or by mixing with another liquid crystalline compound, or by polymerization of these mixtures.

The polymerizable liquid crystal is not particularly limited, and examples thereof include polymerizable liquid crystals described in Japanese Kokai Publication Hei-8-50206 (JP-A H08-50206), Japanese Kokai Publication 2003-315556 (JP-A 2003-315556) and Japanese Kokai Publication 2004-29824 (JP-A 2004-29824), "PALIOCOLOR series" produced by BASF, "RMM series" produced by Merck Ltd., and the like. Among these, a polymerizable liquid crystal represented by the following formula (4) is more preferred since it has excellent heat resistance by having a plurality of polymerizable groups.

[Formula 2]

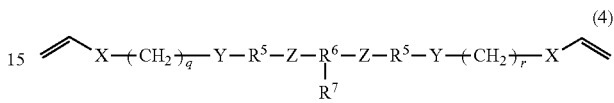

(4)

In the formula (4), q and r each represent an integer of 1 to 10, X represents —COO— or —O—, Y represents —OC(O)O— or —O—, Z represents —COO or —OCO—, $R^5$ represents a phenylene group, $R^6$ represents a substituted phenylene group, a substituted biphenylene group or a fluorenyl group, $R^7$ represents —H, —$(CH_2)_w$—$CH_3$ or —COO—$(CH_2)_w$—$CH_3$ and w represents an integer of 0 to 11.

Furthermore preferably, the polymerizable liquid crystal represented by the formula (4) is more specifically a polymerizable liquid crystal represented by the following formula (4-1) or a polymerizable liquid crystal represented by the following formula (4-2). These polymerizable liquid crystals may be used alone or may be used in combination of two or more species of them.

[Formula 3]

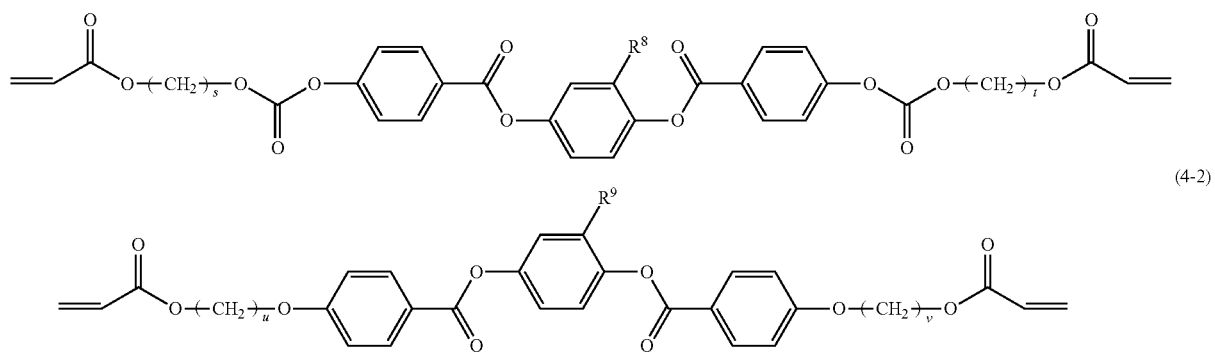

In the formula (4-1), s and t each represent an integer of 2 to 10 and $R^8$ represents —$(CH_2)_w$—$CH_3$.

In the formula (4-2), u and v each represent an integer of 2 to 10 and $R^9$ represents —COO—$(CH_2)_w$—$CH_3$ or —$(CH_2)_w$—$CH_3$.

W represents an integer of 0 to 11.

When the polymerizable liquid crystal represented by the formula (4) is used as the polymerizable liquid crystal, the polymerizable liquid crystal represented by the formula (4) may be used in conjunction with polymerizable liquid crystals represented by the following formulas (5) to (7) in order to adjust a phase transition temperature or mechanical strength of the retardation element.

[Formula 4]

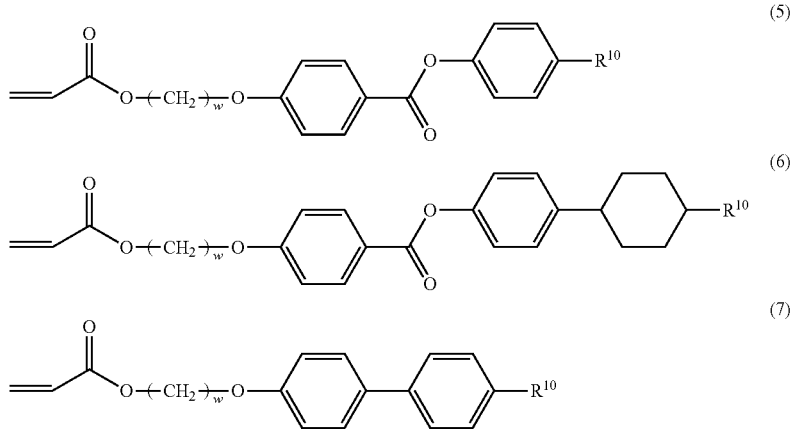

In the formulas (5) to (7), w represents an integer of 0 to 11, $R^{10}$ represents $-O-(CH_2)_y-CH_3$, $-(CH_2)_y-CH_3$ or $-CN$ and y represents an integer of 0 to 12.

The liquid crystalline compound may further contain the polymerizable liquid crystal and a polymerizable compound not having liquid crystallinity as polymerizing components. That is, the liquid crystalline compound may be synthesized by polymerizing a liquid crystalline composition containing the polymerizable liquid crystal and the polymerizable compound. In addition, the liquid crystalline composition may contain the compound represented by the formula (1), the compound represented by the formula (2) and the compound represented by the formula (3).

The polymerizable compound not having liquid crystallinity is not particularly limited, and examples thereof include an ultraviolet curable resin.

The ultraviolet curable resin is not particularly limited, and examples thereof include dipentaerythritol hexa(meth)acrylate, a reaction product of dipentaerythritol penta(meth)acrylate and 1,6-hexamethylene diisocyanate, a reaction product of triisocyanate having an isocyanuric ring and pentaerythritol tri(meth)acrylate, a reaction product of pentaerythritol tri(meth)acrylate and isophorone diisocyanate, dipentaerythritol penta(meth)acrylate, dipentaerythritol tetra(meth)acrylate, pentaerythritol tetra(meth)acrylate, pentaerythritol tri(meth)acrylate, trimethylolpropane tri(meth)acrylate, ditrimethylolpropane tetra(meth)acrylate, tris(acryloxyethyl)isocyanurate, tris(methacryloxyethyl)isocyanurate, a reaction product of glycerol triglycidyl ether and (meth)acrylic acid, caprolactone-modified tris(acryloxyethyl)isocyanurate, a reaction product of trimethylolpropane triglycidyl ether and (meth)acrylic acid, triglycerol di(meth)acrylate, a reaction product of propylene glycol diglycidyl ether and (meth)acrylic acid, poly(propylene glycol)di(meth)acrylate, tripropylene glycol di(meth)acrylate, poly(ethylene glycol)di(meth)acrylate, tetraethylene glycol di(meth)acrylate, triethylene glycol di(meth)acrylate, pentaerythritol di(meth)acrylate, a reaction product of 1,6-hexanediol diglycidyl ether and (meth)acrylic acid, 1,6-hexanediol di(meth)acrylate, glycerol di(meth)acrylate, a reaction product of ethylene glycol diglycidyl ether and (meth)acrylic acid, a reaction product of diethylene glycol diglycidyl ether and (meth)acrylic acid, bis(acryloxyethyl)hydroxyethyl isocyanurate, bis(methacryloxyethyl)hydroxyethyl isocyanurate, a reaction product of bisphenol A diglycidyl ether and (meth)acrylic acid, tetrahydrofurfuryl(meth)acrylate, caprolactone-modified tetrahydrofurfuryl(meth)acrylate, 2-hydroxyethyl(meth)acrylate, 2-hydroxypropyl(meth)acrylate, poly(propylene glycol)(meth)acrylate, poly(ethylene glycol)(meth)acrylate, phenoxyhydroxypropyl(meth)acrylate, acryloyl morpholine, methoxy polyethylene glycol(meth)acrylate, methoxy tetraethylene glycol(meth)acrylate, methoxy triethylene glycol(meth)acrylate, methoxy ethylene glycol(meth)acrylate, methoxyethyl(meth)acrylate, glycidyl(meth)acrylate, glycerol(meth)acrylate, ethyl carbitol(meth)acrylate, 2-ethoxyethyl(meth)acrylate, N,N-dimethylaminoethyl(meth)acrylate, 2-cyanoethyl(meth)acrylate, a reaction product of butyl glycidyl ether and (meth)acrylic acid, butoxy triethylene glycol(meth)acrylate, butanediol mono(meth)acrylate, and the like. These polymerizable compounds not having liquid crystallinity may be used alone or in combination of two or more species of them.

The content of the polymerizable compound not having liquid crystallinity in the liquid crystalline composition is not particularly limited, but the polymerizable compound not having liquid crystallinity has to be added to such an extent that the liquid crystallinity of the liquid crystalline composition is not lost, and a preferred lower limit of the content is 0.1% by weight and a preferred upper limit is 20% by weight, and a more preferred lower limit is 1.0% by weight and a more preferred upper limit is 10% by weight.

When the liquid crystalline compound is a polymerizable liquid crystal of an ultraviolet curable type, or when the polymerizable compound not having liquid crystallinity is ultraviolet-curable, in order to harden these components with ultraviolet light, a photopolymerization initiator is added to the liquid crystalline composition.

The photopolymerization initiator is not particularly limited, and examples thereof include acetophenone compounds such as 2-methyl-1-[4-(methylthio)phenyl]-2-morpholinopropane-1-on ("IRGACURE 907" produced by Ciba Specialty Chemicals, Inc.), 2-benzyl-2-dimethylamino-1-(4-morpholinophenyl)-butanone-1 ("IRGACURE 369" produced by Ciba Specialty Chemicals, Inc.), 1-hydroxycyclohexyl phenyl ketone ("IRGACURE 184" produced by Ciba Specialty Chemicals, Inc.), 4-(2-hydroxyethoxy)-phenyl-(2-hydroxy-2-propyl)ketone ("IRGACURE 2959" produced by Ciba Specialty Chemicals, Inc.), 1-(4-dodecylphenyl)-2-hydroxy-2-methylpropane-1-on ("DAROCUR 953" produced by Merck Ltd.), 1-(4-isopropylphenyl)-2-hydroxy- 2-methylpropane-1-on ("DAROCUR 1116" produced by Merck Ltd.), 2-hydroxy-2-methyl-1-phenylpropane-1-on ("IRGACURE 1173" produced by Ciba Specialty Chemicals, Inc.), diethoxyacetophenone, and the like; benzoin compounds such as benzoin, benzoin methyl ether, benzoin ethyl ether, benzoin isopropyl ether, benzoin isobutyl ether, 2,2-dimethoxy-2-phenylacetophenone ("IRGACURE 651" produced by Ciba Specialty Chemicals, Inc.), and the like; benzophenone compounds such as benzoylbenzoic acid, methyl benzoylbenzoate, 4-phenyl benzophenone, hydroxybenzophenone, 4-benzoyl-4'-methyldiphenylsulfide, 3,3'-dimethyl-4-methoxybenzophenone ("KAYACURE MBP" produced by Nippon Kayaku Co., Ltd.), and the like; thioxanthone compounds such as thioxanthone, 2-clorothioxanthone ("KAYACURE CTX" produced by Nippon Kayaku Co., Ltd.), 2-methyl thioxanthone, 2,4-dimethyl thioxanthone ("KAYACURE RTX" produced by Nippon Kayaku Co., Ltd.), isopropylthioxanthone, 2,4-dichloro thioxanthone ("KAYACURE CTX" produced by Nippon Kayaku Co., Ltd.), 2,4-diethyl thioxanthone ("KAYACURE DETX" produced by Nippon Kayaku Co., Ltd.), 2,4-diisopropyl thioxanthone ("KAYACURE DITX" produced by Nippon Kayaku Co., Ltd.), and the like; and the like. These photopolymerization initiators may be used alone or in combination of two or more species of them.

The content of the photopolymerization initiator in the liquid crystalline composition is not particularly limited, but a preferred lower limit of the content is 0.5 parts by weight and a preferred upper limit is 10 parts by weight and a more preferred lower limit is 2 parts by weight and a more preferred upper limit is 8 parts by weight with respect to 100 parts by weight of the sum of the polymerizable liquid crystal of an ultraviolet curable type and the ultraviolet-curable polymerizable compound not having liquid crystallinity.

When the benzophenone compound or the thioxanthone compound is used as the photopolymerization initiator, it is preferred to use a reaction aid with the photopolymerization initiator in order to promote a photopolymerization reaction.

The reaction aid is not particularly limited, and examples thereof include amine compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy)ethyl 4-dimethylaminobenzoate, isoamyl 4-dimethylaminobenzoate, and the like.

The content of the reaction aid in the liquid crystalline composition is not particularly limited, but the reaction aid is preferably used to the extent that the liquid crystallinity of the liquid crystalline composition is not affected, and a preferred lower limit of the content is 0.5 parts by weight and a preferred upper limit is 10 parts by weight, and a more preferred lower limit is 2 parts by weight and a more preferred upper limit is 8 parts by weight with respect to 100 parts by weight of the sum of the polymerizable liquid crystal of an ultraviolet curable type and the ultraviolet-curable polymerizable compound not having liquid crystallinity.

Further, the content of the reaction aid is preferably 0.5 to 2 times the content of the photopolymerization initiator.

The retardation element of the present invention can be produced, for example, by the step of preparing a liquid crystalline composition containing the liquid crystalline compound, and at least one compound selected from the group consisting of the compound represented by the formula (1), the compound represented by the formula (2) and the compound represented by the formula (3), the step of aligning the liquid crystalline composition in a certain direction by an alignment treatment, and the step of fixing the resulting alignment.

More specifically, for example, the liquid crystalline composition is dissolved in a solvent so as to reach a predetermined concentration and the resulting solution is applied onto a film subjected to a rubbing treatment. Next, the solvent is removed by heating or the like. The liquid crystalline compound is aligned in a certain direction in this heating process or by being left standing at a temperature at which the liquid crystalline compound exhibits a liquid crystal phase after heating. In order to fix the alignment, the liquid crystalline compound may be cooled as it is, or may be hardened through polymerization or the like by irradiating the liquid crystalline compound with ultraviolet light while maintaining the aligned state. The retardation element of the present invention may be produced by swelling the film, which is obtained by polymerization of the polymerizable liquid crystal, with at least one compound selected from the group consisting of the compound represented by the formula (1), the compound represented by the formula (2) and the compound represented by the formula (3).

Examples of the method of the alignment treatment include a method in which a plastic film such as a polyester film or a cellulose film is subjected to a rubbing treatment, a method in which an alignment film is formed on a glass plate or a plastic film and the alignment film is subjected to a rubbing treatment or a photo-alignment treatment, and the like.

The rubbing treatment is achieved by using a rubbing roll produced by bonding a velvet-like rubbing cloth made of nylon, rayon, cotton or the like to a metal roll made of steel, aluminum or the like with a double-faced tape or the like, and rotating the rubbing roll at a high speed to move while being brought into contact with the glass plate or the plastic film.

The conditions of the rubbing treatment may be appropriately adjusted depending on various conditions such as ease of alignment of the liquid crystalline compound to be used, species of the rubbing cloth to be used, the rubbing roll diameter, the number of revolutions of the rubbing roll, the direction of revolution relative to the feeding direction of the substrate, the length of contact between the substrate and the rubbing roll, the strength of pressing the rubbing roll against the substrate, the carrying speed of the substrate, (hereinafter, for the case where the substrate is a plastic film) the wrap angle of a contact portion between the film and the rubbing roll and the carrying tension of the plastic film.

Examples of the method of fixing the alignment include a method in which an ultraviolet-curable (liquid crystalline) compound is hardened through polymerization reaction by irradiation with ultraviolet light in the presence of a photopolymerization initiator to fix the alignment, a method in which a liquid crystalline composition containing a (liquid crystalline) compound having a functional group such as a hydroxyl group, a carboxyl group, an amino group or the like is cross-linked by heating in the presence of a cross-linking agent such as a polyhydric isocyanate compound or a polyhydric epoxy compound capable of reacting with the functional group by crosslinking to fix the alignment, and a method in which a liquid crystalline compound exhibiting a liquid crystal phase in a region of high temperatures is employed and aligned in a high temperature atmosphere, and then is rapidly cooled to fix the alignment state.

Examples of the method of applying the liquid crystalline composition include a spin coating method, a wire-bar coating method, a gravure coating method, a calender coating method, a spray coating method, a meniscus coating method, a slot-die coating method and the like, and these methods are appropriately selected in order to obtain a desired thickness and a desired retardation value.

Although the dose of the ultraviolet irradiation varies depending on the kind and the reactivity of the liquid crystalline compound and the other polymerizable compounds, the kind and the amount of the photopolymerization initiator to be added, and the film thickness, the dose may be generally about 100 to 1000 mJ/cm². In addition, as the atmosphere during ultraviolet irradiation, an appropriate atmosphere, for example, air, an inert gas such as nitrogen, or the like can be selected depending on ease of polymerization.

The retardation element of the present invention has excellent heat resistance, is small in the changes in the retardation value in an atmosphere of high temperatures, and can maintain stable optical performance.

When the refractive index in a direction of maximum refractive index (slow axis direction) in one plane of the retardation element is denoted by $n_x$, the refractive index in a direction perpendicular in one plane to the slow axis direction is denoted by $n_y$, the refractive index in a thickness direction is denoted by $n_z$, and the thickness is denoted by d, the retardation value in a front direction $R_e$ and the retardation value in a thickness direction $R_{th}$ can be respectively determined by the following equations (8) and (9):

$$R_e = (n_x - n_y) \times d \quad (8), \text{ and}$$

$$R_{th} = [\{(n_x + n_y)/2\} - n_z] \times d \quad (9).$$

The values of $n_x$, $n_y$, and $n_z$ can be controlled by the species of the liquid crystalline composition to be used or the method of alignment. Examples of such a method include methods in which a surface tension of a substrate to be aligned, rubbing intensity, species of an alignment film, and the like are adjusted.

A retardation element with an adhesive layer, which contains the retardation element of the present invention and an adhesive layer formed on at least one surface of the retardation element, also constitutes the present invention.

The retardation element with an adhesive layer of the present invention can be easily laminated on a substrate by having an adhesive layer.

An adhesive composing the adhesive layer is not particularly limited, but pressure sensitive adhesives such as an acrylic adhesive, a rubber adhesive, a silicone adhesive, a urethane adhesive, a polyether adhesive, a polyester adhesive and the like are preferred, and an acrylic adhesive is particularly preferred.

Examples of the acrylic adhesive include an acrylic adhesive containing a polymer, which is obtained by copolymerizing a plurality of (meth)acrylic esters as a main component of monomer components.

Examples of the monomer components of the polymer include alkyl esters of (meth)acrylic acid in which an ester portion has 1 to 18 carbon atoms, such as ethyl(meth)acrylate, butyl(meth)acrylate, pentyl(meth)acrylate, hexyl(meth)acrylate, heptyl(meth)acrylate, isoamyl(meth)acrylate, 2-ethylhexyl(meth)acrylate, isooctyl(meth)acrylate, isononyl(meth)acrylate, isomyristyl(meth)acrylate, isostearyl(meth)acrylate, and the like; benzyl(meth)acrylate, naphthyl(meth)acrylate, phenoxyethyl(meth)acrylate, phenoxybutyl(meth)acrylate, 2-hydroxyethyl(meth)acrylate, 4-hydroxyethyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxyrauryl(meth)acrylate, (4-hydroxymethylcyclohexyl)-methylacrylate, 2-methyl-3-hydroxypropyl(meth)acrylate, acrylic acid, methacrylic acid, itaconic acid, maleic acid, glycidyl(meth)acrylate, methyl glycidyl(meth)acrylate, 3,4-epoxycyclohexyl methyl(meth)acrylate, methyl(meth)acrylate, methoxyethyl(meth)acrylate, ethoxymethyl(meth)acrylate, and the like. Further, as the monomer components of the polymer other than the acrylic ester, copolymerizable monomers, such as dimethylaminomethylacrylamide, N,N-dimethylacrylamide, acryloyl morpholine, a vinyl ether monomer, vinyl acetate, (meth)acrylamide, (meth)acrylonitrile, and the like, can be used.

By copolymerizing the above-mentioned monomers, a polymer which is a main component of the acrylic adhesive can be prepared. Among these monomers, it is preferred to use a polymer obtained by copolymerizing at least one of alkyl esters of (meth)acrylic acid in which an ester portion has 1 to 18 carbon atoms, such as ethyl (meth)acrylate, butyl(meth)acrylate, pentyl(meth)acrylate, hexyl(meth)acrylate, heptyl(meth)acrylate, isoamyl(meth)acrylate, 2-ethylhexyl(meth)acrylate, isooctyl(meth)acrylate, isononyl(meth)acrylate, isomyristyl(meth)acrylate, isostearyl(meth)acrylate and the like with at least one of methyl(meth)acrylate, 2-hydroxyethyl(meth)acrylate, 4-hydroxyethyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxyrauryl(meth)acrylate, (4-hydroxymethylcyclohexyl)-methylacrylate, 2-methyl-3-hydroxypropyl(meth)acrylate, N,N-dimethylacrylamide, acrylic acid, methacrylic acid, itaconic acid, and maleic acid. It is particularly preferred to employ a polymer formed by copolymerizing butyl(meth)acrylate and acrylic acid, a polymer formed by copolymerizing butyl(meth)acrylate, methyl(meth)acrylate, and acrylic acid, and a polymer formed by copolymerizing butyl(meth)acrylate, acrylic acid, and 2-hydroxyethyl(meth)acrylate.

The adhesive to be used in the present invention may contain a cross-linking agent in order to adjust the durability of the adhesive or the adhesion force to the retardation element or glass. When a monomer containing a hydroxyl group or a carboxyl group is used as a monomer component composing the adhesive, examples of the cross-linking agent include a cross-linking agent which cross-links the monomer by reacting with a hydroxyl group or a carboxyl group. Examples of the cross-linking agent include an isocyanate compound, an epoxy compound, a metal chelate compound, a melamine compound, an aziridine compound, metal salt, and the like. Examples of the isocyanate compound include toluene diisocyanate, hydrogenated toluene diisocyanate, toluene diisocyanate adduct of trimethylolpropane, xylylene diisocyanate of trimethylolpropane, triphenylmethane triisocyanate, methylene bis(4-phenylmethane)triisocyanate, isophorone diisocyanate, hexamethylene diisocyanate, and ketoxime-blocked products and phenol-blocked products thereof. Further, examples of the isocyanate compound include polyisocyanate compounds forming an isocyanurate ring, a biuret product, an allophanate product and the like.

Examples of the epoxy compound include bisphenol A, epichlorohydrin type epoxy resins, ethylene glycol diglycidyl ether, polyethylene glycol diglycidyl ether, glycerine diglycidyl ether, glycerine triglycidyl ether, 1,6-hexanediol diglycidyl ether, trimethylolpropane triglycidylether, and the like.

Examples of the metal chelate compound include acetylacetone or acetoacetic ester coordination compounds of polyvalent metals such as aluminum, iron, copper, zinc, tin, titanium, nickel, magnesium, and the like.

The cross-linking agent may be used alone or as a mixture of a plurality of the cross-linking agents, and it is preferred to use isophorone diisocyanate, hexamethylene diisocyanate, and ketoxime-blocked products and phenol-blocked products thereof, and epoxy compounds in order to reduce the discoloration in an environment of high temperatures. The amount of the cross-linking agent to be added is preferably in the range of 0.001 to 10 parts by weight and more preferably in the range of 0.01 to 5 parts by weight with respect to 100 parts by weight of the above-mentioned monomer component although it differs depending on the desired physical properties as an adhesive and reactivity.

When the adhesive layer is formed on both sides of the retardation element of the present invention, the adhesive layers on both sides may be composed of the same adhesive or may be composed of different adhesives. The different adhesives means ones in which the molecular weight, the composition of the polymer composing the adhesive layer, the glass transition temperature and the like are different from each other. For example, when substrates to be bonded to the adhesive layers on both sides are different, it is preferred to vary the polymer compositions since the adhesion force to each substrate can be adjusted. Furthermore, by employing an adhesive containing a copolymer of a plurality of monomers including acrylic acid for at least one of the both adhesive layers, the heat resistance of the retardation element is further improved. The adhesive layer may be formed only on one side of the retardation element, or may be formed on both sides. Further, the adhesive layer may be configured by one layer, or may be formed by laminating different adhesive layers.

The adhesive layer may contain a silane coupling agent in order to enhance the adhesion force to a polarizing plate or a glass plate and to suppress a change in appearance after evaluating heat resistance. Examples of the silane coupling agent include vinyltrichlorosilane ("KA-1003" produced by Shin-Etsu Chemical Co., Ltd.), vinyltrimethoxysilane ("KBM-1003" produced by Shin-Etsu Chemical Co., Ltd.), vinyltriethoxysilane ("KBE-1003" produced by Shin-Etsu Chemical Co., Ltd.), vinyltris(β-methoxyethoxy)silane ("KBC-1003" produced by Shin-Etsu Chemical Co., Ltd.), β-(3,4-epoxycyclohexyl)ethyltrimethoxysilane ("KBM-303" produced by Shin-Etsu Chemical Co., Ltd.), γ-glycidoxypropyltrimethoxysilane ("KBM-403" produced by Shin-Etsu Chemical Co., Ltd.), γ-glycidoxypropylmethyldiethoxysilane ("KBE-402" produced by Shin-Etsu Chemical Co., Ltd.), γ-glycidoxypropyltriethoxysilane ("KBE-403" produced by Shin-Etsu Chemical Co., Ltd.), γ-methacryloxypropylmethyldimethoxysilane ("KBE-502" produced by Shin-Etsu Chemical Co., Ltd.), γ-methacryloxypropyltrimethoxysilane ("KBM-503" produced by Shin-Etsu Chemical Co., Ltd.), γ-methacryloxypropylmethyldiethoxysilane ("KBE-502" produced by Shin-Etsu Chemical Co., Ltd.), γ-methacryloxypropyltriethoxysilane ("KBE-503" produced by Shin-Etsu Chemical Co., Ltd.), γ-methacryloxypropyltrimethoxysilane ("SZ-6030" produced by Dow Corning Toray Silicone Co., Ltd.), N-β-(N-vinylbenzylaminoethyl)-γ-aminopropyltrimethoxysilane hydrochloride ("SZ-6032" produced by Dow Corning Toray Silicone Co., Ltd.), γ-aminopropyltrimethoxysilane ("SZ-6083" produced by Dow Corning Toray Silicone Co., Ltd.), γ-diallylaminopropyltrimethoxysilane ("AX43-065" produced by Dow Corning Toray Silicone Co., Ltd.), N-β-(aminoethyl)-γ-aminopropylmethyldimethoxysilane ("KBM-602" produced by Shin-Etsu Chemical Co., Ltd.), N-β-(aminoethyl)-γ-aminopropyltrimethoxysilane ("KBM-603" produced by Shin-Etsu Chemical Co., Ltd.), N-β-(aminoethyl)-γ-aminopropyltriethoxysilane ("KBE-603" produced by Shin-Etsu Chemical Co., Ltd.), γ-aminopropyltrimethoxysilane ("KBM-903" produced by Shin-Etsu Chemical Co., Ltd.), γ-aminopropyltriethoxysilane ("KBM-903" produced by Shin-Etsu Chemical Co., Ltd.), N-phenyl-γ-aminopropyltrimethoxysilane ("KBM-573" produced by Shin-Etsu Chemical Co., Ltd.), γ-(2-aminoethyl)-aminopropyltrimethoxysilane ("SH 6020" produced by Dow Corning Toray Silicone Co., Ltd.), γ-(2-aminoethyl)-aminopropylmethyldimethoxysilane ("SH 6023" produced by Dow Corning Toray Silicone Co., Ltd.), γ-chloropropyltrimethoxysilane ("KBM-703" produced by Shin-Etsu Chemical Co., Ltd.), γ-mercaptopropyltrimethoxysilane ("KBM-803" produced by Shin-Etsu Chemical Co., Ltd.), and the like.

The adhesive layer may contain an ultraviolet absorber in order to improve the light resistance of the adhesive layer and the retardation element. Examples of the ultraviolet absorber include malonic ester compounds, oxanilide compounds, benzotriazole compounds, benzophenone compounds, triazine compounds, benzoate compounds, hindered amine compounds, and the like.

In the formation of the adhesive layer, a solution formed by mixing and dissolving the polymer, the cross-linking agent, and the silane coupling agent and the ultraviolet absorber, which are added as required, in a solvent is applied onto a release film so as to have a desired thickness. Next, the applied solution is dried by heating to remove the solvent, and thereby, an adhesive layer in which the polymer is cross-linked is formed. Furthermore, this adhesive layer is bonded to the retardation element of the present invention, and then the release film is peeled off, and the exposed adhesive layer can be bonded to a substrate such as a glass plate, a polarizing plate or the like. Further, the adhesive layer may be stored with being sandwiched between two release films which are different in the peeling force. In this case, it is possible that one release film is peeled off and then the exposed adhesive layer is bonded to the retardation element, and thereafter the other release film is peeled off and the exposed adhesive layer is bonded to a substrate such as a glass plate, a polarizing plate or the like.

The retardation element of the present invention may be formed on a substrate subjected to an alignment treatment, and the formed retardation element may be used as it is together with the substrate or may be peeled off from the substrate subjected to an alignment treatment by using another substrate having an adhesive layer to be laminated on the another substrate.

Examples of the substrate include films of cellulose such as triacetyl cellulose, cycloolefin polymer films, polycarbonate films, polyester films and the like. These films function as a retardation film by making these films have birefringence through stretching or the like. For example, a composite retardation element can be obtained by laminating a plurality of retardation elements of the present invention or by laminating the retardation film and the retardation element of the present invention directly or with an adhesive or a bond therebetween.

A composite retardation element comprising a plurality of layers laminated, wherein at least one layer is the retardation element of the present invention, also constitutes the present invention.

The retardation element of the present invention, the retardation element with an adhesive layer of the present invention or the composite retardation element of the present invention can be used as a quarter-wave plate by setting a retardation value to a quarter of a wavelength (for example, by setting a retardation value at a wavelength of 560 nm to 140 nm), and these retardation elements can convert linearly polarized light to circularly polarized light or can convert circularly polarized light to linearly polarized light. Further, these retardation elements can be used as a half-wave plate by setting a retardation value to a half of a wavelength (for example, by setting a retardation value at a wavelength of 540 nm to 270 nm), and can change an optical axis of the linearly polarized light.

Further, an optical element can be obtained by laminating the retardation element of the present invention, the retardation element with an adhesive layer of the present invention or the composite retardation element of the present invention with a polarizing plate directly, or with an adhesive layer therebetween.

An optical element, which is a laminate of the retardation element of the present invention, the retardation element with an adhesive layer of the present invention or the composite retardation element of the present invention and a polarizing plate, also constitutes the present invention.

The polarizing plate is not particularly limited as long as it is a polarizing plate having a function of converting light from a light source to polarized light, and an absorbing type polarizing plate which absorbs light in a specific direction and converts light to polarized light and a reflection type polarizing plate which reflects light in a specific direction and converts light to polarized light can be employed.

Examples of the absorbing type polarizing plate include a polarizing element obtained by uniaxially stretching a hydrophilic polymer film such as a polyvinyl alcohol film or the like, which contains a dichroic colorant such as a dye, polyiodine ion or the like, a polarizing element obtained by dehydrating a polyvinyl alcohol film with an acid before or after uniaxial stretching to form a polyene structure, a polarizing element obtained by applying a solution of a dichroic colorant which exhibits a lyotropic liquid crystal state onto an alignment film treated so as to align in a certain direction and removing the solvent, a polarizing element obtained by adding a dichroic colorant to a polyester film and uniaxially stretching the polyester film, or polarizing plates formed by laminating these polarizing elements with a protective film such as a film of cellulose, for example, triacetyl cellulose, a cycloolefin polymer film, or the like.

Examples of the reflection type polarizing plate include a polarizing element formed by laminating a plurality of layers which are different in birefringence, a polarizing element formed by combining a cholesteric liquid crystal having a selective reflection region with a quarter-wave plate, a polarizing element provided with fine wire grids on its substrate, or polarizing plates formed by laminating these polarizing elements with a protective film such as a film of cellulose, for example, triacetyl cellulose, a cycloolefin polymer film or the like, or with an inorganic substrate of glass, crystal, sapphire or the like. The bond or the adhesive to be used for lamination is not particularly limited, and an acrylic adhesive, a rubber adhesive, a silicone adhesive, a urethane adhesive, a polyether adhesive, a polyester adhesive, and the like are particularly preferred.

Further, by laminating the quarter-wave plate, which is made of the retardation element of the present invention, the retardation element with an adhesive layer of the present invention or the composite retardation element of the present invention, with a polarizing plate in such a manner that an angle formed by the slow axis of the quarter-wave plate with the absorption axis of the polarizing plate is 45°, a circularly polarizing plate, which is an embodiment of the optical element of the present invention, can be attained. Furthermore, by laminating the half-wave plate, which is made of the retardation element of the present invention or the composite retardation element of the present invention, with a polarizing plate in such a manner that an angle formed by the slow axis of the half-wave plate with the absorption axis of the polarizing plate is 45°, an optical rotation plate, which is an embodiment of the optical element of the present invention, can be attained.

Further, when the retardation element of the present invention is a retardation element having a discotic liquid crystal layer in which a hybrid alignment is employed, an optical element for improving a viewing angle for a TN type or an OCB type liquid crystal display, which is an embodiment of the optical element of the present invention, can be attained by laminating the retardation element on a polarizing plate in such a manner that the slow axis of the retardation element is in the same direction as the absorption axis of the polarizing plate.

Further, when the refractive index in a slow axis direction of the retardation element of the present invention is denoted by $n_x$, the refractive index in a direction perpendicular to the slow axis direction is denoted by $n_y$, and the refractive index in a thickness direction is denoted by $n_z$, by laminating the retardation element in which $n_x=n_y>n_z$ with a polarizing plate, an optical element for improving a viewing angle for a VA type liquid crystal display, which is an embodiment of the optical element of the present invention, can be attained. Further, by laminating at least one retardation element in which $n_x>n_z>n_y$ with a polarizing plate in such a manner that a fast axis of the retardation element is in the same direction as an absorption axis of the polarizing plate, an optical element for improving the viewing angle of an IPS (in-plane switching) type liquid crystal display, which is an embodiment of the optical element of the present invention, can be attained.

An image display device can be prepared by incorporating the retardation element, the retardation element with an adhesive layer, the composite retardation element or the optical element of the present invention, thus obtained, into an image display device. An image display device, which includes the retardation element, the retardation element with an adhesive layer, the composite retardation element or the optical element of the present invention, also constitutes the present invention.

The image display device is not particularly limited, and examples thereof include a liquid crystal display, a plasma display device, an electroluminescence type display device and the like, and the image display device is particularly suitably used for the liquid crystal display. A liquid crystal display, which includes the retardation element, the composite retardation element or the optical element of the present invention, also constitutes the present invention. Examples of the liquid crystal displays include, although varying depending on the kind of a liquid crystal cell to be used, TN type, OCB type, STN type, VA type, IPS type, and the like. Further, the display device can be used in various forms such as car navigation systems, monitors for rear entertainment, onboard monitors of an instrument panel or a car audio system, monitors of personal computers, liquid crystal televisions, liquid crystal projectors, and the like.

Effects of the Invention

According to the present invention, it is possible to provide a retardation element which has excellent heat resistance, is small in the changes in the retardation value in an atmosphere of high temperatures, and is capable of maintaining stable optical performance.

MODE FOR CARRYING OUT THE INVENTION

Hereinafter, aspects of the present invention will be described in more detail by way of examples, but the present invention is not limited to these examples.

Example 1

(1) Preparation of Retardation Element 100 parts by weight of a polymerizable liquid crystal of an ultraviolet curable type ("PARIOCOLOR LC242" produced by BASF, a polymerizable liquid crystal in which s is 4 and t is 4 in the above formula (4-1)), 4 parts by weight of 2,4,6-trimethylbenzoyldiphenylphosphine oxide ("LUCIRIN TPO" produced by BASF), and 0.1 parts by weight of a leveling agent ("BYK-361" produced by BYK) were dissolved in 243 parts by weight of cyclopentanone to prepare a solution whose solid content was 30% by weight. Next, 10 parts by weight of triethylene glycol di-2-ethylhexanoate (3GO) was added and the resulting mixture was stirred until the mixture became homogeneous to prepare a solution of a liquid crystalline composition. Next, a polyester film ("A4100" produced by TOYOBO Co., Ltd.) was subjected to a rubbing treatment using a rubbing machine (manufactured by EHC Co., Ltd., rubbing roll diameter 45 mm, number of revolution of a rubbing roll 1500 rpm, transfer speed 1 m/min). The solution of a liquid crystalline composition was applied onto a rubbed surface of the polyester film with a spin coater and dried at 80° C. for 1 minute, and the liquid crystalline composition was irradiated with a high-pressure mercury lamp (630 mJ/cm$^2$) in an atmosphere replaced with a nitrogen gas to harden to prepare a film having the retardation element of the present invention. The prepared retardation element had a thickness of 4 μm. The retardation value of the retardation element obtained after removing the polyester film was measured with an automatic birefringence analyzer ("KOBRA-21ADH" manufactured by Oji Scientific Instruments) to find that the retardation value at a wavelength of 540 nm was 270 nm.

(2) Preparation of Construct

An acrylic adhesive layer was disposed between the retardation element obtained in the above paragraph (1) and a glass plate to prepare a construct in which the retardation element, the acrylic adhesive layer and the glass plate were laminated in this order. In addition, the acrylic adhesive layer is an adhesive layer which is formed by cross-linking a polymer, obtained by copolymerizing butyl acrylate, methyl acrylate, N,N-dimethylacrylamide and 2-hydroxyethyl acrylate, with an isocyanate cross-linking agent.

Example 2

A retardation element was prepared in the same manner as in Example 1 except for changing the amount of triethylene glycol di-2-ethylhexanoate (3GO) to be added to 1 part by weight. The prepared retardation element had a thickness of 2 μm and the retardation value of the element at a wavelength of 540 nm was 270 nm. Thereafter, a construct was prepared in the same manner as in Example 1.

Example 3

A retardation element was prepared in the same manner as in Example 1 except for changing the amount of triethylene glycol di-2-ethylhexanoate (3GO) to be added to 5 parts by weight. The prepared retardation element had a thickness of 3 μm and the retardation value of the element at a wavelength of 540 nm was 270 nm. Thereafter, a construct was prepared in the same manner as in Example 1.

Example 4

A retardation element was prepared in the same manner as in Example 1 except for changing the amount of triethylene glycol di-2-ethylhexanoate (3GO) to be added to 12 parts by weight. The prepared retardation element had a thickness of 4 μm and the retardation value of the element at a wavelength of 540 nm was 270 nm. Thereafter, a construct was prepared in the same manner as in Example 1.

Example 5

A construct was prepared in the same manner as in Example 2 except for using an adhesive layer, which is formed by cross-linking a polymer, obtained by copolymerizing butyl acrylate, methyl acrylate and acrylic acid, with an epoxy cross-linking agent, as an acrylic adhesive layer.

Example 6

98 parts by weight of a polymerizable liquid crystal of an ultraviolet curable type in which u is 6, v is 6 and R$^9$ is —C(=O)OC$_5$H$_{11}$ in the above formula (4-2), and 2 parts by weight of 2-benzyl-2-dimethylamino-1-(4-morpholinophenyl)-butanone-1 ("IRGACURE 369" produced by Ciba Specialty Chemicals, Inc.) were dissolved in 100 parts by weight of cyclopentanone to prepare a solution whose solid content was 50% by weight. Next, 10 parts by weight of triethylene glycol di-2-ethylhexanoate (3GO) was added and the resulting mixture was stirred until the mixture became homogeneous to prepare a solution of a liquid crystalline composition. A film having the retardation element of the present invention was prepared by the same operation as in Example 1 by using this solution. The prepared retardation element had a thickness of 5 μm. The retardation value of the retardation element obtained after removing the polyester film was measured with an automatic birefringence analyzer ("KOBRA-21ADH" manufactured by Oji Scientific Instruments) to find that the retardation value at a wavelength of 540 nm was 340 nm. Thereafter, a construct was prepared in the same manner as in Example 1.

Example 7

A retardation element was prepared in the same manner as in Example 6 except for using 10 parts by weight of tetraethylene glycol di-2-ethylhexanoate (4GO) in place of triethylene glycol di-2-ethylhexanoate (3GO). The prepared retardation element had a thickness of 4 μm. The retardation value of the retardation element obtained after removing the polyester film was measured with an automatic birefringence analyzer ("KOBRA-21ADH" manufactured by Oji Scientific Instruments) to find that the retardation value at a wavelength of 540 nm was 279 nm. Thereafter, a construct was prepared in the same manner as in Example 1.

Example 8

A retardation element was prepared in the same manner as in Example 6 except for using 10 parts by weight of triethylene glycol di-2-ethylbutyrate (3 GH) in place of triethylene glycol di-2-ethylhexanoate (3GO). The prepared retardation element had a thickness of 4 μm. The retardation value of the retardation element obtained after removing the polyester film was measured with an automatic birefringence analyzer ("KOBRA-21ADH" manufactured by Oji Scientific Instruments) to find that the retardation value at a wavelength of 540 nm was 278 nm. Thereafter, a construct was prepared in the same manner as in Example 1.

Example 9

A retardation element was prepared in the same manner as in Example 6 except for using 10 parts by weight of di-2-ethylhexyl phthalate in place of triethylene glycol di-2-ethylhexanoate (3GO). The prepared retardation element had a thickness of 5 μm. The retardation value of the retardation element obtained after removing the polyester film was measured with an automatic birefringence analyzer ("KOBRA-21ADH" manufactured by Oji Scientific Instruments) to find that the retardation value at a wavelength of 540 nm was 307 nm. Thereafter, a construct was prepared in the same manner as in Example 1.

Comparative Example 1

A retardation element was prepared in the same manner as in Example 1 except for not adding triethylene glycol di-2-ethylhexanoate (3GO). The prepared retardation element had a thickness of 3 μm and the retardation value of the element at a wavelength of 540 nm was 270 nm. Thereafter, a construct was prepared in the same manner as in Example 1.

Comparative Example 2

A retardation film prepared by uniaxially stretching a polycarbonate film was bonded to a glass plate by use of the acrylic adhesive layer used in Example 1 to prepare a construct.

Comparative Example 3

A retardation element was prepared in the same manner as in Example 6 except for not adding triethylene glycol di-2-ethylhexanoate (3GO). The prepared retardation element had a thickness of 3 μm and the retardation value of the element at a wavelength of 540 nm was 275 nm. Thereafter, a construct was prepared in the same manner as in Example 1.

Comparative Example 4

A retardation element was prepared in the same manner as in Example 6 except for using 10 parts by weight of dibutyl maleate in place of triethylene glycol di-2-ethylhexanoate (3GO). The prepared retardation element had a thickness of 3 μm. The retardation value of the retardation element obtained after removing the polyester film was measured with an automatic birefringence analyzer ("KOBRA-21ADH" manufactured by Oji Scientific Instruments) to find that the retardation value at a wavelength of 540 nm was 226 nm. Thereafter, a construct was prepared in the same manner as in Example 1.

Comparative Example 5

A retardation element was prepared in the same manner as in Example 6 except for using 10 parts by weight of ditridecyl phthalate in place of triethylene glycol di-2-ethylhexanoate (3GO). The prepared retardation element had a thickness of 4 μm. The retardation value of the retardation element obtained after removing the polyester film was measured with an automatic birefringence analyzer ("KOBRA-21ADH" manufactured by Oji Scientific Instruments) to find that the retardation value at a wavelength of 540 nm was 244 nm. Thereafter, a construct was prepared in the same manner as in Example 1.

Comparative Example 6

A retardation element was prepared in the same manner as in Example 6 except for using 10 parts by weight of triethyl citrate in place of triethylene glycol di-2-ethylhexanoate (3GO). The prepared retardation element had a thickness of 4 μm. The retardation value of the retardation element obtained after removing the polyester film was measured with an automatic birefringence analyzer ("KOBRA-21ADH" manufactured by Oji Scientific Instruments) to find that the retardation value at a wavelength of 540 nm was 245 nm. Thereafter, a construct was prepared in the same manner as in Example 1.

Comparative Example 7

A retardation element was prepared in the same manner as in Example 6 except for using 10 parts by weight of triethylene glycol diheptanoate (3G7) in place of triethylene glycol di-2-ethylhexanoate (3GO). The prepared retardation element had a thickness of 3 μm. The retardation value of the retardation element obtained after removing the polyester film was measured with an automatic birefringence analyzer ("KOBRA-21ADH" manufactured by Oji Scientific Instruments) to find that the retardation value at a wavelength of 540 nm was 226 nm. Thereafter, a construct was prepared in the same manner as in Example 1.

<Evaluation>

(Heat Resistance Evaluation 1)

The following evaluation was performed on the constructs obtained in Examples 1 to 9 and Comparative Examples 1 to 7. The results of the evaluation are shown in Table 1.

Each construct was measured with an automatic birefringence analyzer ("KOBRA-21ADH" manufactured by Oji Scientific Instruments) to find that the initial retardation value at a wavelength of 540 nm was as shown in Table 1.

Next, the construct was left standing in a high temperature atmosphere of 140° C. for 30 minutes and the change rate of the retardation value between before and after being left standing was measured. Here, values of the change rate in Table 1 were determined by the following equation.

Change rate(%)=[{(retardation value after a lapse of 30 minutes at 140° C.)−(initial retardation value)}/(initial retardation value)]×100

(Heat Resistance Evaluation 2)

The following evaluation was performed on the constructs obtained in Examples 1, 2, 5, 6 and 9 and Comparative Examples 1, and 3 to 7. The results of the evaluation are shown in Table 2.

Each construct was measured with an automatic birefringence analyzer ("KOBRA-21ADH" manufactured by Oji Scientific Instruments) to find that the initial retardation value at a wavelength of 540 nm was as shown in Table 2.

Next, the construct was left standing in a high temperature atmosphere of 100° C. for two weeks and a change rate of the retardation value between before and after being left standing was measured. Here, values of the change rate in Table 2 were determined by the following equation.

Change rate(%)=[{(retardation value after a lapse of two weeks at 100° C.)−(initial retardation value)}/(initial retardation value)]×100

TABLE 1

| | Initial retardation value (nm) | Retardation value after 30 minutes at 140° C. (nm) | Change rate in Heat Resistance Evaluation 1 (%) |
|---|---|---|---|
| Example 1 | 270 | 269 | −0.4 |
| Example 2 | 270 | 257 | −4.8 |
| Example 3 | 270 | 260 | −3.7 |
| Example 4 | 270 | 272 | 0.7 |
| Example 5 | 270 | 259 | −4.1 |
| Example 6 | 340 | 339 | −0.3 |
| Example 7 | 279 | 272 | −2.5 |
| Example 8 | 278 | 274 | −1.4 |
| Example 9 | 307 | 301 | −2.0 |
| Comparative Example 1 | 270 | 225 | −16.7 |
| Comparative Example 2 | 263 | 199 | −24.3 |
| Comparative Example 3 | 275 | 260 | −5.5 |
| Comparative Example 4 | 226 | 215 | −4.9 |
| Comparative Example 5 | 244 | 225 | −7.8 |
| Comparative Example 6 | 245 | 229 | −6.5 |
| Comparative Example 7 | 226 | 214 | −5.3 |

TABLE 2

| | Initial retardation value (nm) | Retardation value after two weeks at 100° C. (nm) | Change rate in Heat Resistance Evaluation 2 (%) |
|---|---|---|---|
| Example 1 | 270 | 262 | −3.0 |
| Example 2 | 270 | 258 | −4.4 |
| Example 5 | 270 | 269 | −0.4 |
| Example 6 | 340 | 336 | −1.2 |
| Example 9 | 307 | 301 | −2.0 |
| Comparative Example 1 | 270 | 207 | −23.3 |
| Comparative Example 3 | 275 | 240 | −12.7 |
| Comparative Example 4 | 226 | 205 | −9.3 |
| Comparative Example 5 | 244 | 213 | −12.7 |
| Comparative Example 6 | 245 | 221 | −9.8 |
| Comparative Example 7 | 226 | 204 | −9.7 |

From Table 1, it was found that in the retardation elements prepared in Examples 1 to 5, the changes in the retardation value in a high temperature atmosphere were substantially suppressed compared with that in Comparative Example 1. Further, it was found that though the compounds used in Example 6 or Example 8 had structures similar to that of the compound used in Comparative Example 7, in the retardation elements of Examples 6 and 8, the changes in the retardation value in a high temperature atmosphere were small, and on the other hand, the retardation element of Comparative Example 7 was approximately equal in the change in the retardation value to the retardation element of Comparative Example 3, in which the compound was not added, and substantially did not have the effect of suppressing the changes in the retardation value. Furthermore, in Table 2, the retardation elements of the present invention could suppress the changes in the retardation value in a high temperature atmosphere for a long time compared with those in comparative examples. Further, from the results of Examples 2 and 5, it was found that it is possible to further suppress the changes in the retardation value over a long period in a high temperature atmosphere by using an adhesive layer containing acrylic acid as a polymerization component as an adhesive layer to be formed on the surface of the retardation element.

INDUSTRIAL APPLICABILITY

In accordance with the present invention, it is possible to provide a retardation element which has excellent heat resistance, is small in the changes in the retardation value in an atmosphere of high temperatures, and is capable of maintaining stable optical performance.

The retardation element of the present invention can display stable images even when it is used in car navigation systems, monitors for rear entertainment, onboard monitors of an instrument panel or a car audio system and liquid crystal projectors, which are often used in an atmosphere of high temperatures, or in display devices used in a severe environment.

The invention claimed is:
1. A retardation element,
which comprises a blend of a liquid crystalline compound and at least one compound selected from the group consisting of a compound represented by the following formula (1), a compound represented by the following formula (2) and a compound represented by the following formula (3):

[Formula 1]

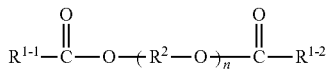  (1)

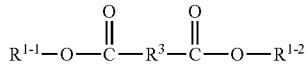  (2)

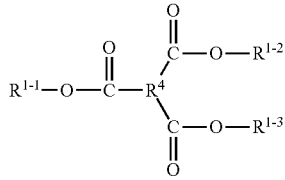  (3)

wherein in the formula (1), n represents an integer of 3 to 10 and $R^2$ represents a —$CH_2$—$CH_2$— group, a —$CH_2$—$CH(CH_3)$— group or a —$CH_2$—$CH_2$—$CH_2$— group,
in the formula (2), $R^3$ represents a —$(CH_2)_p$— group or a phenylene group and p represents an integer of 4 to 8,
in the formula (3), $R^4$ represents a substituted phenylene group, and
in the formulas (1) to (3), $R^{1-1}$, $R^{1-2}$ and $R^{1-3}$ each represent an alkyl group having a branched structure having 5 or more carbon atoms and $R^{1-1}$, $R^{1-2}$ and $R^{1-3}$ may be the same or different,
wherein the retardation element has excellent heat resistance, exhibits little variation in its retardation value in high-temperature atmospheres, and can maintain stable optical properties,
wherein the liquid crystalline compound is a polymerizable liquid crystal and said polymerizable liquid crystal is polymerized, and wherein the polymerizable liquid crystal is a polymerizable liquid crystal represented by the following formula (4):

[Formula 2]

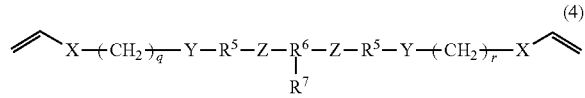
(4)

wherein q and r each represent an integer of 1 to 10, X represents —COO— or —O—, Y represents —OC(O)O— or —O—, Z represents —COO or —OCO—, $R^5$ represents a phenylene group, $R^6$ represents a substituted phenylene group, a substituted biphenylene group or a fluorenyl group, $R^7$ represents —H, —$(CH_2)_w$—$CH_3$ or —COO—$(CH_2)_w$—$CH_3$ and w represents an integer of 0 to 11.

2. The retardation element according to claim 1, wherein the diester compound represented by the formula (1) is triethylene glycol di-2-ethylhexanoate, tetraethylene glycol di-2-ethylhexanoate, triethylene glycol di-2-ethylbutyrate, tetraethylene glycol di-2-ethylbutyrate, pentaethylene glycol di-2-ethylhexanoate, octaethylene glycol di-2-ethylhexanoate, nonaethylene glycol di-2-ethylhexanoate or decaethylene glycol di-2-ethylhexanoate.

3. The retardation element according to claim 1, wherein the diester compound represented by the formula (2) is bis(2-ethylhexyl) adipate, bis(2-ethylbutyl) adipate, bis(2-ethylhexyl) azelate, bis(2-ethylbutyl) azelate, di-2-ethylhexyl sebacate, di-2-ethylbutyl sebacate, di-2-ethylhexyl phthalate or di-2-ethylbutyl phthalate.

4. The retardation element according to claim 1, wherein the triester compound represented by the formula (3) is tri-2-ethylhexyl trimellitate or tri-2-ethylbutyl trimellitate.

5. The retardation element according to claim 1, wherein the content of at least one compound selected from the group consisting of the compound represented by the formula (1), the compound represented by the formula (2) and the compound represented by the formula (3) is 0.1 to 300 parts by weight with respect to 100 parts by weight of the liquid crystalline compound.

6. A retardation element with an adhesive layer, comprising the retardation element according to claim 1, 2, 3, 4, or 5, and an adhesive layer,
wherein the adhesive layer is formed on at least one surface of the retardation element, and contains a copolymer of a plurality of monomers including acrylic acid.

7. A composite retardation element, comprising a plurality of layers laminated,
wherein at least one layer is the retardation element with an adhesive layer according to claim 6.

8. An optical element,
which is a laminate of the retardation element with an adhesive layer according to claim 6 and a polarizing plate.

9. An image display device,
which comprises the retardation element with an adhesive layer according to claim 6.

10. A liquid crystal display,
which comprises the retardation element with an adhesive layer according to claim 6.

11. A composite retardation element, comprising a plurality of layers laminated,
wherein at least one layer is the retardation element according to claim 1, 2, 3, 4, or 5.

12. An optical element,
which is a laminate of the composite retardation element according to claim 11 and a polarizing plate.

13. An image display device,
which comprises the composite retardation element according to claim 11.

14. A liquid crystal display,
which comprises the composite retardation element according to claim 11.

15. An optical element,
which is a laminate of the retardation element according to claim 1, 2, 3, 4, or 5 and a polarizing plate.

16. An image display device,
which comprises the optical element according to claim 15.

17. A liquid crystal display,
which comprises the optical element according to claim 15.

18. An image display device,
which comprises the retardation element according to claim 1, 2, 3, 4, or 5.

19. A liquid crystal display,
which comprises the retardation element according to claim 1, 2, 3, 4, or 5.

* * * * *